June 9, 1925.  1,541,081

P. H. E. VAREILLE

POSITIVE VALVE CONTROL MECHANISM

Filed May 26, 1924

Inventor
P. H. E. Vareille
By Marks & Clerk
attys.

Patented June 9, 1925.

1,541,081

UNITED STATES PATENT OFFICE.

PIERRE HENRI EDMOND VAREILLE, OF LEVALLOIS-PERRET, FRANCE.

POSITIVE-VALVE-CONTROL MECHANISM.

Application filed May 26, 1924. Serial No. 716,047.

*To all whom it may concern:*

Be it known that I, PIERRE HENRI EDMOND VAREILLE, citizen of the French Republic, residing at Levallois-Perret, Seine, in the French Republic, have invented new and useful Improvements in Positive-Valve-Control Mechanisms, of which the following is a specification.

The present invention relates to an arrangement for the positive control of a motor valve, i. e. a valve control device in which the valve is actuated by a rocking lever whereof one end is engaged between two cams having a suitable outline, the opening and the closing of the valve being positively controlled by the said cams. In the known devices of this class, the pivoting axle pin of the rocking lever is stationary, and for this reason it is practically impossible to obtain the tight closing of the valve.

The present invention has for its object a device of this class providing for the fluid tight closing of the valve, and which is chiefly characterized in that the pivoting axle pin of the rocking lever is carried by a movable support which is yieldingly mounted upon the cylinder head of the engine, whilst an adjustable stop-piece limits the movement of the said axle pin under the action of the said support, the adjustment of the said stop-piece being such that in the closing position of the valve a slight play is provided between the axle pin and said stop-piece.

This arrangement provides for the fluid tight closing of the valve in all cases by the elastic pressure of the valve upon its seat, while on the other hand for the opening of the valve under the positive control, the pivoting axle pin of the rocking lever comes immediately into contact with the adjustable stop-piece, and from this time onward the device will operate in the known manner. Other features of the invention will be set forth in the following description.

The appended drawings show by way of example an embodiment of the said invention.

Figure 1:
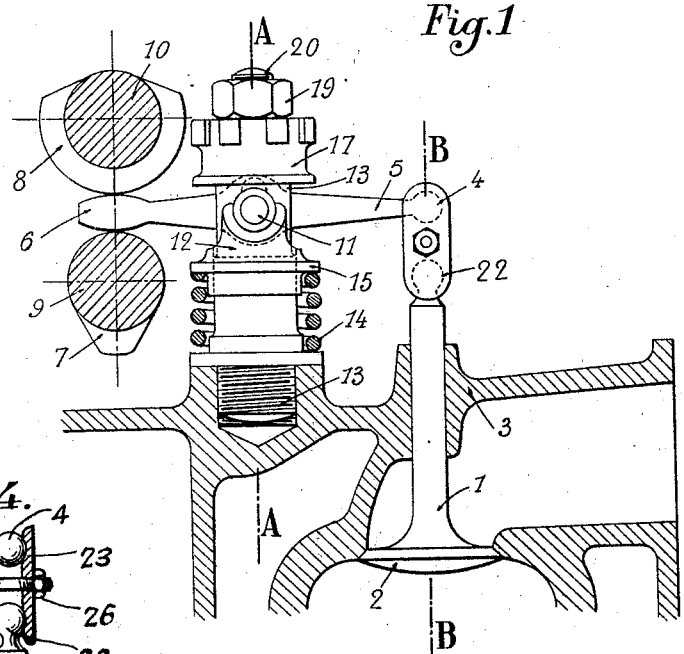
Fig. 1 is an elevational view of the device with the valve closed, the cylinder and the cam shafts being shown in section.
Figure 4:
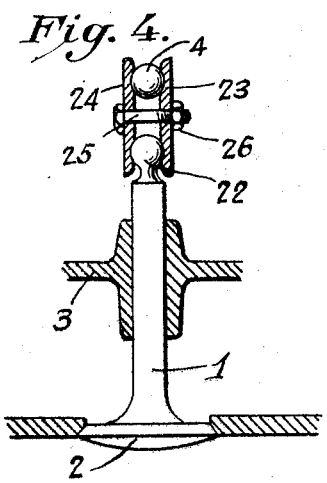
Fig. 4 is a vertical section on line B—B of Fig. 1, showing the connection between the valve stem and the rocking lever.
Figure 3:
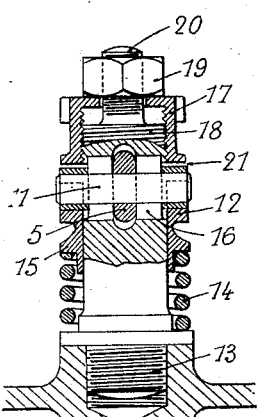
Fig. 3 is a vertical axial section on line A—A of Fig. 1.
Figure 2:
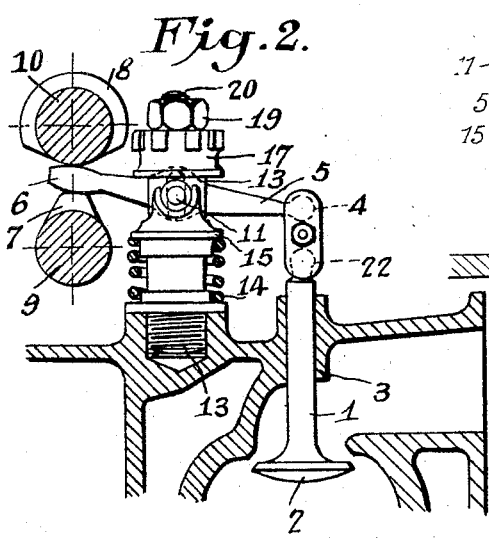
Fig. 2 is a like view with the valve open.

The stem 1 of the valve 2 is slidable in a guide 3 formed in the cylinder head and is connected with one end 4 of the rocking lever 5 whose other end 6 is engaged between a cam 7 and a coacting cam 8 which have for example the outlines shown in Figs. 1 and 2, said cams being mounted respectively upon the shafts 9 and 10 rotating at the same speed. At the middle of the said rocker arm is mounted a pivoting axle pin 11 resting upon a support 12 adapted to slide on a vertical rod 13 which is rigidly secured to the cylinder head; a spring is interposed between the cylinder head and a shoulder 15 provided upon the said support, so that the latter shall be upwardly impelled in a constant manner. In order to allow the motion of the axle 11 under the action of the spring 14, the said axle pin extends through an elongated slot 16 formed in the rod 13.

The ascent of the axle pin with its support is limited by an adjustable stop-nut 13 which is screwed upon a screwthreaded portion 18 of the rod 13, and is held in the desired position by a lock-nut 19 screwed upon the screwthreaded upper end of the rod 13. The position of the nut 17 is so adjusted that in the closing position, as shown in Fig. 1, a slight play 21 is allowed between the upper generatrix of the axle pin 11 and the lower edge of the nut 17. The end 4 of the rocking lever and the upper end of the valve stem have a ball shape and are connected together by the two plates 23, 24 which have corresponding recesses for the said balls and are secured together by a bolt 25 and a nut 26.

The operation is as follows:

When the valve is closed, Fig. 1, the end 6 of the rocking lever is held between the circular profiles of the cams 7 and 8. In these conditions, the said lever will pivot upon the fixed end 6 under the action of the support 12 which is urged upwards by the spring 14. By reason of the initial adjustment of the position of the stop-nut 17 as above indicated, the valve will be closed before the axle pin 11 comes into contact with the nut 17, so that at this moment the lever 5 is under the action of the said spring, and the valve is caused to bear upon its seat in an elastic and fluid-tight manner.

The cams 7 and 8 then turn through half-a revolution and reach the position shown in Fig. 2, lifting the end 6 of the rocker 5; at the beginning of this movement, the axle pin 11 passes through the small space or play 21 and comes into contact with the nut 17; the support 12 follows this movement under the action of the spring 14. From this time onward, the lever 5 will pivot upon its axle pin 11, thereby opening the valve.

During the next half-revolution of the cams 7 and 8, the rocking lever will pivot in the contrary direction about its axle pin 11 and thus begins to close the valve; then under the action of the cams the axle pin will recede from the nut 17 and will resume the position of Fig. 1; at this time the spring 14 again acts freely so as to tightly close the valve.

It should be observed that the play 21 is just sufficient to permit the elastic action of the spring 14, without allowing the said axle pin to come into contact with the nut 17 when the valve is closed, the said play being from 0.1 to 0.2 mm.; the vertical movement of the said axle pin, obviously equal to this play, will hence be very small, so that no vibration can take place and a perfectly silent running is obtained. Further, the energy absorbed in order to overcome the resistance of the spring is negligible, since the spring has a very small stroke.

The control device according to the invention will thus offer at the same time the advantages inherent in the positive control wherein the rocking lever is constantly maintained by cams, without having to overcome the resistance of the spring during the entire stroke of the valve as is the case for the usual control with single cam, as well as the advantage inherent in this latter control wherein the valve is tightly closed by the elastic pressure of a spring.

It should also be remarked that the said connection between the rocking lever 5 and the valve stem 1 allows of taking up the wear of the joint, it being simply necessary for this purpose to tighten the nut 26.

Obviously, the said invention is not limited to the form of construction hereinbefore described, but is susceptible of numerous modifications in detail without departing from the principle of the invention.

Having now described my invention, what I claim as new and desire to secure by Letters Patent is:

1. In a positive valve control mechanism a movable support carrying the pivot of the rocker arm and supported by the engine, an adjustable stop-piece carried by the engine and yielding means urging said support and pivot towards said stop piece, said stop piece being so adjusted that, for the closing position of the valve, a slight play is provided between the pivot and the stop piece, whereby the valve is yieldingly pressed upon its seat.

2. In a positive valve control mechanism a rod secured to the engine, a support adapted to slide on said rod and carrying the pivot of the rocker arm, a nut screwed on said rod and a spring urging said support and pivot towards said nut, the latter being so adjusted as to leave a slight play between the pivot and the nut, for the closing position of the valve whereby the valve is yieldingly pressed upon its seat.

3. In the mechanism as claimed in claim 1 the further feature residing in that the adjacent ends of the valve stem and the rocking lever have a ball shape, two clamping plates provided with recesses for said ball portions being adapted to connect said rocking lever to the valve stem.

In testimony whereof I have signed my name to this specification,

PIERRE HENRI EDMOND VAREILLE.